(No Model.)
J. JACKSON.
APPARATUS FOR CONNECTING FLEXIBLE TUBES OR HOSE.
No. 442,121.　　　　　　　　　　Patented Dec. 9, 1890.
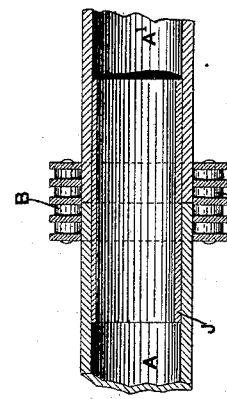
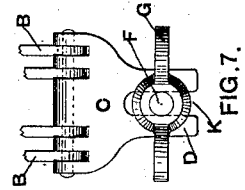
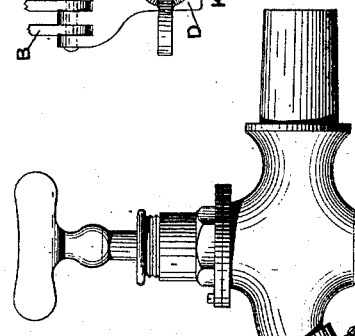
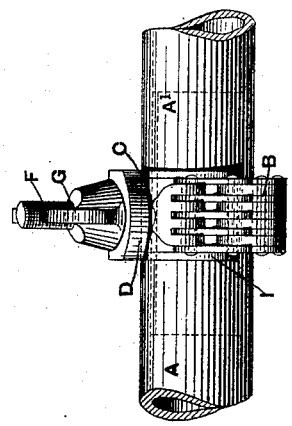
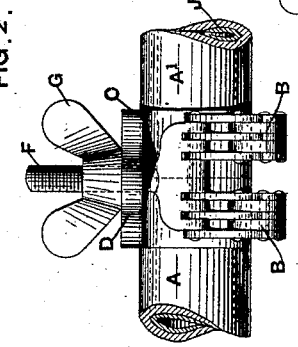
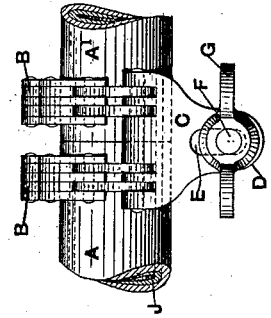
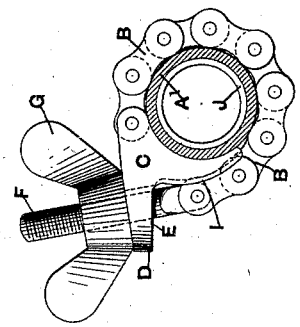
Witnesses
Geo. Snyder.
Stephen Jannus
Inventor
James Jackson,
By Geo. F. Whiteley
atty.

UNITED STATES PATENT OFFICE.

JAMES JACKSON, OF MANCHESTER, ENGLAND.

APPARATUS FOR CONNECTING FLEXIBLE TUBES OR HOSE.

SPECIFICATION forming part of Letters Patent No. 442,121, dated December 9, 1890.

Application filed September 10, 1890. Serial No. 364,529. (No model.) Patented in England June 10, 1890, No. 8,951.

*To all whom it may concern:*

Be it known that I, JAMES JACKSON, a citizen of the United Kingdom of Great Britain and Ireland, and a resident of Manchester, in the county of Lancaster, England, have invented certain new and useful Improvements in Apparatus for Connecting Flexible Tubes or Hose, (for which I have obtained Letters Patent in Great Britain, dated June 10, 1890, No. 8,951,) of which the following is a specification.

This invention relates to apparatus and devices for connecting and coupling flexible tubes and hose.

According to these improvements the connecting device consists of a band, chain, or cord connected at one end to a saddle and at the other end to a tightening-screw, which passes through a slot or opening formed in the saddle or in a projection therefrom, and is actuated by a winged or other suitable nut. The flexible tube or hose having been placed upon the tail-pipe, bib, or other part to which it is to be connected, the band, chain, or cord is passed around it and tightened by turning the nut upon the screw, thereby compressing and firmly securing the pipe or hose upon the part to which it is connected.

If the device is to be used for the purpose of coupling two lengths of hose or tubing, a short length of tube is passed into the contiguous ends of the hose and each end may be separately secured on the short tube by one of the connecting devices; or both ends may be brought close together upon the short tube and be simultaneously compressed or screwed by a single or double chain, band, or cord, operated by one tightening nut and screw.

I will more particularly describe my invention with reference to the accompanying drawings, in which—

Figure 1 is an end view; Fig. 2, an elevation; Fig. 3, a longitudinal section; Fig. 4, a plan; Fig. 5, a side view; Fig. 6, an elevation of apparatus constructed according to these improvements, and Fig. 7 a modification.

In each of the figures the end or ends of the flexible tube A A' is or are represented as being compressed by a flexible chain B; but it will be understood that although I prefer to employ such a chain a steel or other suitable and equivalent band, or in some cases a wire or cord, may be employed in substitution therefor. If a cord or wire is employed instead of the chain, I may secure thereto a strip of leather or other similar material in such a manner and position that the strip comes between the cord or wire and acts as a cushion, thus preventing the hose being cut by the cord or wire. One end of the chain B is pinned or otherwise secured to the saddle C, upon which there is formed a projection D, in which is a slot or opening E, through which passes the screw F. The other end of the chain is pinned or otherwise suitably secured to the lower end of the screw F, which is actuated so as to tighten or slacken the chain by means of a wing or similar nut G.

When it is desired to employ the apparatus simply for the purpose of connecting a flexible tube or hose to a tail pipe, tube, bib-cock, or the like article, the chain or band is of comparatively narrow width, as shown in Fig. 6; but when it is desired to connect the ends of contiguous lengths of the flexible tube or hose the chain is preferably made broader, as shown in Figs. 2 and 3, or two separate chains may be employed, as shown in Figs. 4 and 5. In the latter case both the chains may be secured at their opposite ends to the tightening-screw and to the saddle, respectively, as represented in Figs. 4 and 5, so that both of the chains are tightened or loosened simultaneously by the rotation of the nut on the tightening-screw. To prevent the collapse of the tubes A and A' when they are connected together, as in Figs. 1 to 5, inclusive, a short lining-tube J is inserted in the ends. In some cases the edges of the saddle may be raised, so as to form vertical flanges I outside the chain, as indicated in Figs. 1 and 2. These flanges act as guides, and are preferably employed when the chain used is a narrow one—as, for example, with two links and one or three, alternately—but they may either be omitted or used in all cases. The internal part of the saddle is formed concave, so as to fit approximately to the curvature of the tube to which it may be applied, and the apparatus may be made in various sizes to fit upon or correspond with the various sizes of tube or hose.

In using the connecting or coupling device the nut is unscrewed, so as to loosen the chain, and the chain and saddle are slipped over the end of the flexible hose or tube, which is then placed on the pipe, tube, or other article with which the connection has to be made and the chain is tightened by rotating the nut.

When the apparatus is employed for the purpose of connecting two contiguous lengths of hose A A', a short length of thin tube J is inserted for half its length into the end of one length of hose, and the other end of the hose is slipped over the projecting half of J, so that the two ends of the hose are brought close together upon the short tube. The saddle is then brought over the junction of the two lengths of hose, so that the broad chain embraces each equally, as in Figs. 2 and 3; or so that the two chains are respectively on the ends A and A', as in Figs. 4 and 5.

It will frequently be necessary or convenient to apply the apparatus to hose in such positions or cases that it cannot be slipped over the end of the tube. In order to provide for this, I may open the hole or slot E through the front of the projection D, as shown at K, Fig. 7. With this arrangement, assuming that the apparatus is already in opposition, as shown in Figs. 1 to 6, the nut is loosened by rotation, whereupon the screw F may be withdrawn entirely from the opening E through K and the chain may be straightened out. To put the apparatus again into position, it is necessary only to lay the saddle upon the hose, pass the chain around, and enter the screw through K into E and tighten the nut. To prevent accidental loss of the nut, I may head the upper end of the screw, or burr the outer end of the screw-thread.

The description of chain which I prefer to employ is that known as "machine" or "pitch" chain, and for garden or similar hose it may be about three-eighths of an inch pitch. To prevent corrosion, the links may be stamped from sheet zinc, brass, or copper.

Having now particularly described my said invention and in what manner the same is to be performed, I declare that what I claim is—

The combination, with the abutting flexible tubes A A', of the lining-tube J, the saddle C, curved to fit the tubes A A' and having a perforated abutment D, the chain B, secured at one end to the saddle C and lying against the tubes on both sides of the joint, the screw F, attached to the other end of the chain, and the nut G, fitting the screw F and working against the abutment D, substantially as described.

In testimony that I claim the foregoing as my invention I have signed my name, in presence of two witnesses, this 23d day of August, 1890.

JAMES JACKSON.

Witnesses:
WM. E. HEYS,
GEO. W. ROWE.